United States Patent [19]

Milgram

[11] Patent Number: 4,698,668
[45] Date of Patent: Oct. 6, 1987

[54] APPARATUS FOR INFLUENCING THE PRESENTATION OF VISUAL INFORMATION

[75] Inventor: Paul Milgram, Amsterdam, Netherlands

[73] Assignee: Canadian Industrial Innovation Centre/Waterloo, Waterloo, Canada

[21] Appl. No.: 526,647

[22] Filed: Aug. 26, 1983

[30] Foreign Application Priority Data

Aug. 30, 1982 [NL] Netherlands ............... 8203370

[51] Int. Cl.$^4$ ............................................ H04N 13/00
[52] U.S. Cl. ........................................ 358/92; 358/88; 340/784; 350/331 R; 350/332; 350/350 R
[58] Field of Search ............... 358/3, 88, 92; 350/330, 350/331 R, 332, 335, 350 R, 346, 130–144, 349; 356/23, 26; 340/784; 351/41, 49; 434/59

[56] References Cited

U.S. PATENT DOCUMENTS

| | | | |
|---|---|---|---|
| 3,575,491 | 4/1971 | Heilmeier | 350/332 |
| 3,737,567 | 6/1973 | Kratomi | 358/92 |
| 3,792,915 | 2/1974 | Oh | 350/350 R |
| 3,821,466 | 6/1974 | Roese | 358/92 |
| 3,833,287 | 9/1974 | Taylor et al. | 350/349 |
| 3,975,286 | 8/1976 | Oh | 350/350 R |
| 3,984,343 | 10/1976 | Cole, Jr. et al. | 350/330 |
| 4,005,032 | 1/1977 | Haas et al. | 350/350 R |
| 4,021,846 | 5/1977 | Roese | 358/92 |
| 4,029,393 | 6/1977 | Dungan et al. | 350/331 R X |
| 4,054,368 | 10/1977 | Krueger et al. | 350/335 X |
| 4,106,217 | 8/1978 | Witt | 350/331 R X |
| 4,139,278 | 2/1979 | Matsumoto et al. | 350/331 R X |
| 4,214,267 | 7/1980 | Roese et al. | 358/88 X |
| 4,283,177 | 8/1981 | Kron et al. | 434/59 |
| 4,294,516 | 10/1931 | Brooks | 350/331 R X |
| 4,328,493 | 5/1982 | Shanks et al. | 350/346 X |
| 4,364,039 | 12/1982 | Penz | 350/335 X |
| 4,370,647 | 1/1983 | Brantingham | 350/331 R X |
| 4,376,567 | 3/1983 | Banda | 380/335 |
| 4,396,250 | 8/1983 | Wade et al. | 350/349 X |
| 4,404,555 | 9/1983 | Long et al. | 350/332 X |
| 4,447,132 | 5/1984 | de Zwart | 350/330 X |
| 4,477,805 | 10/1984 | Arton et al. | 350/330 X |
| 4,525,032 | 6/1985 | Hilsam | 350/331 R |
| 4,556,289 | 12/1985 | Fergason | 350/349 X |

OTHER PUBLICATIONS

"Liquid Crystal Reflection Cell with Improved Response Times", Hasker et al., *Applied Optics*, Oct. '80, vol. 19, #19, pp. 3257–3259.

*Primary Examiner*—James J. Groody
*Assistant Examiner*—Victor R. Kostak
*Attorney, Agent, or Firm*—Craig R. Armstrong

[57] ABSTRACT

An electro-optical device for influencing the presentation of visual information when placed before the eyes of an observer, comprising one or more cholesteric liquid crystal cells which, under the control of an electric driving signal, can be rapidly switched, by means of the cholesteric-nematic phase change effect, between a clear, transparent texture and a cloudy, scattering texture. The invention is particularly suited for applications as a spectacle-mounted stroboscope, tachistoscope or stereoscopic viewer, wherein special features are the absence of color distortion, the continued illumination of the eye during visual occlusion and the very high switching speeds.

7 Claims, 3 Drawing Figures

APPARATUS FOR INFLUENCING THE PRESENTATION OF VISUAL INFORMATION

BACKGROUND OF THE INVENTION

This invention relates to a device for influencing the visual information presented to at least one eye of at least one observer, whereby a shutter apparatus is placed between the observer's eye and the source of the visual information. Each shutter apparatus comprises one or more liquid crystal cells, each of which comprises a layer of liquid crystal material surrounded by two parallel plates of glass, the surfaces of which are coated with a transparent conductive film. By introducing an electrical voltage between each pair of plates the light transmission characteristics of each cell can be regulated.

Such an optical device is known from U.S. Pat. No. 4,021,846. That device has as its objective that an observer perceive in three dimensions images generated by a visual display device, by means of synchronizing the operation of the shutter apparatus with alternately presented display images, such that each of the observer's eyes receives information intended for that eye only. The liquid crystal cells in that apparatus are constructed by sandwiching a layer of nematic liquid crystal material between two parallel plates of glass. The surfaces of the plates which are in contact with the liquid crystal material are coated with a transparent conductive film, thus allowing the plates to serve as electrodes, across which an electric field can be applied. The liquid crystal cells used in that invention have the property that the plane of polarization of incident polarized light can be continuously rotated from 0° to 90°, depending on the magnitude of the voltage imposed across the electrodes. The liquid crystal cells are placed between crossed polarizers in order to cause the transmission of light through the cell to vary between a minimum and a maximum value, in conjunction with the imposed steering voltage. When suitable images intended for alternate presentation to an observer's eyes are presented on a suitable display device, an appropriate steering signal can be sent to the liquid crystal apparatuses to ensure that each of the alternatiňg displayed images is presented only to the appropriate eye of the observer, in order thus to allow the observer to perceive depth in the resulting composite image. Such images can be, for example, images whose composition is determined by display elements generated by a measuring or computing device, or pictorial images which are produced on a display device such as a television receiver. In all cases, in order to achieve a continuous three dimensional representation, the alternating picture elements must each be presented from a geometrical side-by-side perspective appropriate to the perspective intended to be viewed by the corresponding eye of the observer.

One disadvantage of such a stereoscopic viewing device is that not all wavelengths of incident light are equally affected, resulting in an unsatisfactory reproduction of colour images. In addition, the polarizing filters absorb an appreciable amount of the incident light, which reduces the perceived intensity of the entire visual environment, including the presented display image. Yet another disadvantage is that the switching times between the light and dark states for this device are relatively large, thus necessitating the simultaneous blanking of the images intended for both eyes for an appreciable amount of time during part of the presentation cycle in order to prevent either eye from receiving any information intended for the opposite eye. Consequently, for the high rates of presentation of display images necessary for the perception of continuously fused images, the proportion of time during which both eyes receive no information is relatively large. This can result in a disturbing flickering effect, which is very fatiguing for the eyes of the observer. Another consequence is a reduction in the upper limit on the speed of continuous perceived motion of the three dimensional images which one is able to display.

There do, however, exist liquid crystal cells which may be switched more rapidly and which are also able to influence the transmission of incident light without necessitating the use of polarizing filters with their accompanying disadvantages. Such liquid crystal cells are able, depending on the presence of an appropriate applied electric field, either to scatter incident light or to transmit the light relatively undisturbed. The fact that such scattering liquid crystal cells can not be switched to a dark opaque state has in general acted as an obstacle towards their utilization for such practical applications as liquid crystal display devices.

The liquid crystal shutter apparatus of this invention is based on the realization that, for applications wherein visual information is repeatedly prevented from arriving at an observer's eyes, it is not a disadvantage that such a shutter device does not become dark but rather an advantage, because during the intervals between consecutive presentations of external visual information the observer's eye is illuminated by an appreciable portion of the incident light scattered by the liquid crystal cell itself. The result is that when the liquid crystal cell is switched between states the illumination of the eye fluctuates much less than it would if the liquid crystal cell were to become dark, such as occurs with liquid crystal cells which operate with polarizing filters. Whereas repeated switching between the transparent and opaque, that is, between light and dark, states can have a fatiguing effect upon the eye, this fatigue is much diminished if the switching is done between the transparent and scattering states since the eye does not have to adapt as much to the incident light of the transparent state.

In general there are two principal means by which liquid crystal materials can be switched, under control of an imposed electric field, between the transparent and the scattering states. One way to achieve this effect is by disturbing the order of the liquid crystal molecules with the electric field. This mode of scattering light is called the dynamic scattering mode and it can be achieved with nematic liquid crystals as well as, in an analogous fashion, with cholesteric liquid crystals. This mode is characterized by a scattering ON-state which is obtained during the imposition of an appropriate electric field, and a transparent OFF-state which is reached after removal of the electric field. The ON-OFF (scattering-transparent) transition is caused by the gradual reorientation of the liquid crystal molecules, due to electrode surface forces, and can sometimes be accelerated by applying an appropriate alternating electric field. Three optical liquid crystal devices which employ this dynamic scattering mode of switching and to which the present invention relates are known from West German Patent Publication DE-A No. 2 111 067, French Patent Publication FR-A No. 2 132 598 and from a report by C. Perrot published in Electronique and Microelectronique, No. 228, 15 Nov. 1976, pp. 39-41. All of these devices are characterized by a transparent OFF-state and a scattering ON-state.

The present invention is based on the second manner of switching liquid crystals between the transparent and scattering states and can be realized with so-called cholesteric liquid crystals, which are normally produced by adding a small amount of cholesteric material to a nematic liquid crystal. Instead of disturbing the order of the liquid crystal molecules with an electric field in order to scatter incident light, as in dynamic scattering, the present liquid crystals are able to scatter light in their natural OFF-state. On the other hand, whenever an appropriate and sufficiently large alternating electric field is applied across the electrodes, the natural helical orientation of the liquid crystal molecules becomes unwound and a transparent ON-state results. The transition between the scattering and transparent states with such mixtures is known as the cholesteric-nematic phase change effect.

The present invention is based on the various advantages of employing the cholesteric-nematic phase change effect, as compared to the switching characteristics of the other optical liquid crystal devices which have been mentioned.

One advantage is that the transition of cholesteric liquid crystals from the (scattering) OFF-state to the (transparent) ON-state occurs at a critical value of the electric field and not at a critical threshold voltage. This critical field value can be varied over a wide range, wherein it can be raised by increasing the concentration of cholesteric in the liquid crystal mixture or by decreasing the separation of the electrode plates. Since a higher threshold field implies a faster switching time, very short turn-ON times can be achieved with cholesteric liquid crystals as compared with other liquid crystals.

Another advantage is that the transition from the (transparent) ON-state to the (scattering) OFF-state is not a gradual and uniform transition which is determined by electrode surface forces, as is the case with other liquid crystals. The nematic-cholesteric transition is a direct function rather of the optical activity of the liquid crystal molecules and, due to the fact that cholesteric liquid crystals are among the most optically active substances known, it is possible to obtain much shorter turn-OFF times as compared with other types of liquid crystals.

Summarizing these two advantages, liquid crystal devices whose operation is based on the cholesteric-nematic phase change effect can be constructed to achieve speeds of switching back and forth between the ON and OFF states which are much faster than can be achieved with either dynamic scattering liquid crystal devices or with liquid crystal devices which rely on crossed polarizers.

A third advantage of liquid crystal devices employing the cholesteric-nematic phase change effect with respect to the other liquid crystal devices which are also capable of scattering incident light concerns the relationship between the imposition and removal of the electric field and the corresponding transparent and scattering states of the devices. For all of these devices the switching times accompanying the imposition of an electric field are shorter than the switching times which result from the molecular relaxation processes which commence subsequent to the removal of the electric field. In order to present visual information to an observer at controlled instants in time and for very short periods of time, it is important that this information be made to appear quickly and without distortion. This requirement can therefore be fulfilled more satisfactorily with a device which quickly switches from scattering (OFF) to transparent (ON) with the imposition of an electric field than with a device which operates conversely. Furthermore, whenever visual information is to be removed from an observer's view, the transition time from transparent to total scattering is less critical than for the complementary transition from scattering to transparent, because whenever information is to be removed, the information will become occulted from the observer's eye relatively soon after the scattering of incident light commences and much before completion of the full transition to the maximum degree of scattering.

To summarize, both the ON-OFF and OFF-ON switching characteristics of liquid crystal optical devices which employ the cholesteric-nematic phase change effect are consequently superior to those of other light scattering liquid crystal devices for purposes of tachistoscopic, i.e. very brief, presentation of visual information to an observer.

OBJECTS OF THE INVENTION

Accordingly, a primary object of the present invention is to provide a liquid crystal device which can be placed between one or both eyes of an observer and a source of visual information and which can be electronically commanded to allow said visual information to be presented to or occulted from the observer's eyes.

A further object of the invention is to appear transparent during those periods in which visual information is being presented to the observer's eye and to occult visual information beyond the device by scattering the incident light and thereby illuminating the observer's eye as much as possible for the duration of the scattering period. A parallel object of the invention, therefore, is to minimize fatigue of the eyes of the observer over all phases of its operation.

A further object of the invention is, during those periods in which visual information is being presented to the observer's eye, not to distort the colour content of that information and to minimize any decreases in the intensity of light transmitted through the device.

A further object of the invention is to achieve the transparent state for each liquid crystal cell by means of increasing the electric field across the liquid crystal cell to excede an appropriate threshold level, and to achieve the scattering state by means of decreasing the electric field to below this threshold level. In other words, the device is to be transparent in its ON-state and is to scatter incident light in its OFF-state.

A further object of the invention is the ability to switch from the OFF to the ON state and from the ON to the OFF state in the shortest time possible.

A further object of the invention is that it be able independently to occult from each of the observer's eyes either all of the visual information beyond the device or selected portions of the visual field of which that information is a part.

A further object of the invention is that it be realizable in a light, comfortable and portable form, preferably in a spectacle-mounted embodiment.

A further object of the invention is to allow stroboscopic presentation independently to each eye of visual information from the visual field of each eye.

A further object of the invention is to allow tachistoscopic presentation independently to each eye of visual information from the visual field of each eye.

A further object of the invention is, in combination with suitable electronic signal circuitry and with a suitable apparatus which is able alternately to generate or to reproduce display images which geometrically correspond to images to be presented alternately to the left eye and the right eye of an observer, to enable the perception by the observer of a composite stereoscopic representation of (moving) display images with a minimum of perceptible flicker and with no distortion of the colour content of the display images.

SUMMARY OF THE INVENTION

In accordance with these and other objects, the invention is characterized by the use of liquid crystal cells containing an appropriate cholesteric liquid crystal compound, which, depending on an imposed alternating electric field and by means of the cholesteric-nematic phase change effect, are able either to scatter incident light or to allow it to be transmitted essentially unhindered. The transparent and scattering states of these cells correspond, respectively, to the ON and the OFF states of the electric field imposed across the cells.

An advantage of using this type of liquid crystal cell as an optical device is that during its operation the wavelengths of incident light are not affected, thus enabling undistorted observation of coloured images. In addition, no polarizing filters are necessary, which would otherwise lead to an appreciable attenuation of the intensity of incident light. Furthermore, due to the relatively very fast switching times attainable with this type of liquid crystal cell, a broad range of objectives can be achieved.

A considerable saving in the amount of energy consumed by the device can be achieved by constructing the driving voltage circuitry such that during the turn-on phase an electric field which is appreciably larger than the critical electric field necessary for switching the cell is imposed across the cell and after the turn-on phase has been completed the electric field is reduced to a lower value which is closer to but nevertheless still greater than the critical value for maintaining the transparent state. By maintaining this lower field for the remainder of the transparent phase, large savings in energy can be achieved, while preserving the advantages of rapid switching from scattering to transparent. This energy saving can be very useful for portable, battery-operated realizations of the invention.

Whenever a particular liquid crystal cell does not efficiently scatter incident light in its OFF-state, such as during conditions of insufficient ambient illumination, it may be desireable to align two or more liquid crystal cells stacked in layers with their surfaces in parallel, thus allowing them to operate cumulatively in the scattering phase.

One advantage of using liquid crystals to implement an electronically controlled apparatus for influencing the presentation of visual information is the ability to subdivide the electrode surfaces of liquid crystal cells into separate segments such that each segment of a subdivided cell may be independently activated. When implemented in a device such as the present invention the consequent ability to present or occult information from different sections of the observer's visual field independently can be useful for perceptual and cognitive psychological research. This ability to subdivide electrode surfaces is common to all liquid crystal cells; however, one advantage of using light scattering liquid crystals, as in the present device, is that the perception of any particular segment of the visual field will not be greatly disturbed due to sharp gradients in light intensity if an adjacent segment has been occulted. Furthermore, by employing cholesteric liquid crystals which can be switched by means of the cholesteric-nematic phase change effect, individual segments of the liquid crystal cells can be switched on and off very rapidly. A practical advantage of such large switching speeds is that a relatively large number of independent segments of a single cell, arranged in an orderly fashion such as a matrix pattern, can be switched by means of conventional multiplexing methods, rather than by having to make separate electrical connections to each of these cell segments.

Another application of the present invention is as a device for stroboscopic presentation of visual information, where, by placing liquid crystal cells, mounted for example on a spectacle frame, before one or both of an observer's eyes and by repeatedly switching the device to its transparent state for short periods of time, the same effect can be achieved as would be had with the conventional stroboscopic technique of synchronously illuminating a recurring image or rotating object together with its visual surround by means of repeated flashes of light. The advantage of the present invention is that neither the user of the invention, implemented as a stroboscopic viewer, nor other people who may be present will be disturbed by potentially bothersome and/or fatiguing flashes of light. In addition to this, it is possible to have several people who are present in the same visual environment and equipped with similar devices independently stroboscopically observe a number of different periodically recurring images without influencing each other's observations.

Yet another application of the present invention is as a tachistoscope, that is, a device commonly used in perceptual research, whereby according to the invention visual images can be presented to one or both eyes, or to portions of the visual fields of the eyes, of one or more experimental subjects for very short periods of time. The experimental subjects are no longer constrained to looking into an enclosed container but, due to the portable nature of the invention when mounted on a spectacle frame and worn by the subjects, and especially if implemented without wires connecting the device to a signal generator, are now free to walk about unhindered and may thus be presented with a much broader range of both stationary and moving visual information, without influencing the colour content of those images. For circumstances in which insufficient scattering of light is attained in the cells' OFF-state, two or more liquid crystal cells can be stacked in layers parallel to each other in front of both eyes and can be operated as a composite shutter device with no losses in speed of switching. Because of these properties, the electro-optic shutter devices according to the invention have a broad range of applications in different areas of, but not limited to, education and natural, medical and behavioural sciences.

Two liquid crystal shutter devices of the present invention can be combined and mounted on the left and right sides of a single spectacle frame to form an apparatus whose driving voltage source can be made such that each of the component devices can be switched either simultaneously or independently at different moments in time, especially in an alternating fashion, between its transparent and scattering states. Such a spectacle-mounted apparatus can be used for stereoscopic viewing, by means of presenting the wearer with appropriate temporally alternating images on a visual display device while synchronizing the switching of each of the shutter devices such that the left eye device is in its transparent state and the right eye device in its scattering state whenever the image intended for the left eye is displayed and the right eye device is in its transparent state and the left eye device in its scattering state whenever the image intended for the right eye is displayed. The high switching speeds which are achievable ensure that efficient use may be made of the time available for presenting the display images, without having to blank both left and right eye information simultaneously. In order to compensate for the slightly longer times necessary to switch such liquid crystal cells from the transparent (ON) to the scattering (OFF) states, it is possible to construct the switching circuitry such that the signal commanding a particular cell to switch off arrives slightly before the cycle time for the corresponding display image has been completed.

Whenever a similar stereoscopic viewing apparatus, the accompanying image display apparatus and the synchronizing signal generating apparatus can be implemented such that successive left eye and right eye information can be presented to an observer at a faster rate than would otherwise be attainable, the composite three dimensional image will be perceived with reduced flicker and thus with less concomitant visual fatigue, but with no loss in the quality of the colour of the perceived images. The high switching speeds which are achievable with the present device enable the attainment of this object in a number of ways. When used in conjunction with devices on which the displayed images are either continuously produced or are rapidly generated by means of their individual vector elements, the present liquid crystal stereoscopic viewing device can be switched between the left and right eyes as quickly as the completed left and right eye images can be successively presented. The switching frequency of such a system will be constrained by the limits of the display apparatus, the stereoscopic viewer and perceptual capabilities of the observer.

When used in conjunction with display devices, such as conventional television receivers, which generate images by means of raster scanning, the left and right eye images can be made to correspond to successive complete raster scanning cycles, or frames. The great advantage of such an implementation is that stereoscopic image perception may be achieved with no internal modifications necessary to the display production apparatus. Display information for such a display device may be generated by one or more data processing or computing devices or it may be obtained via two geometrically compatible transduction devices, such as conventional television cameras, whose outputs are alternately switched electronically and then combined to form a single information carrying signal. Conventional signal recording, storing and playback devices can therefore be used in this application, with no modifications necessary. It is nevertheless possible to modify such display production apparatuses by increasing the frame cycle rate of the input, recording, playback and display image production devices. Due to the high switching speeds achievable with the present invention, the left and right eye shutters can still be synchronized with such rapidly alternating frames and a three dimensional image with reduced flicker will be obtained. It is further possible to retain the conventional raster frame frequency but to multiply by an odd integral factor the rate at which left and right eye information is switched at the input of the display information generation or transduction stage. Instead of the conventional correspondance between one frame and a complete left or right eye image, fractional portions, or bands, of these images will now be successively presented on the display device during each raster frame cycle. Due to the high switching speeds achievable with the present invention, the left and right eye shutters can be synchronized with such rapidly alternating corresponding left and right eye fractional frame portions, resulting in a single composite image with reduced flicker.

Figure 1:
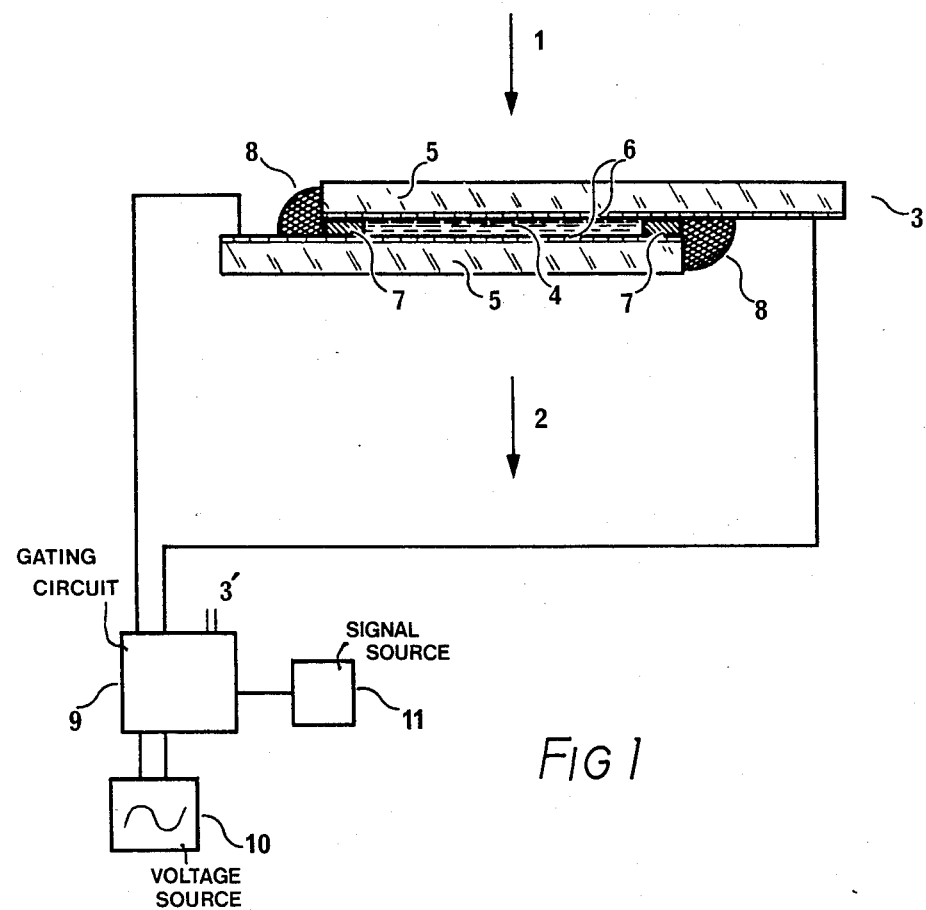
FIG. 1 is a schematic cross-section of a device according to the present invention, including a schematic block diagram of an accompanying electrical power and switching circuit.

The preferred and alternative embodiments of the invention will now be described with reference to the accompanying drawings.

DETAILED DESCRIPTION

The device shown serves to influence a beam of light 1 originating from a light source, while the transmitted light 2 is intended for one or both eyes of an observer.

A shutter device 3 which serves to influence the incident light is constructed from a thin layer 4 of a cholesteric liquid crystal enclosed between two glass plates 5, each of which is coated on the side adjacent to the layer 4 of liquid crystal with a transparent electrically conductive layer 6. The desired distance between the glass plates 5 is maintained by a separator 7, while a sealing material 8 is used to seal the area enclosed between the plates. The portions of the electrical coating 6 on the glass plates 5 which extend beyond the opposite glass plate can be used to make external electrical connections.

The cholesteric liquid crystal mixture is of the type which, depending on the electric field imposed across the conductive electrode coatings 6, can be made to exhibit either a clear, transparent texture or a cloudy, scattering texture. To accomplish this the electrodes 6 are connected via a gating circuit 9 to an alternating voltage source 10 with an appropriate frequency, of approximately 1 KHz or more for example. The amplitude and frequency of the imposed alternating voltage are chosen, depending on the composition of the cholesteric liquid crystal mixture and on the thickness of the cell, to exceed a required critical electric field and thus to achieve rapid switching between the scattering and transparent states. The mode by which the liquid crystal changes states between scattering and transparent is the so-called cholesteric-nematic phase change effect. This transformation is characterized, for a particular cell, by a transparent state whenever the electric field is raised above a critical value, corresponding to the ON-state, and a light scattering state whenever the electric field is lowered below the critical value, corresponding to the OFF-state.

Figure 3:
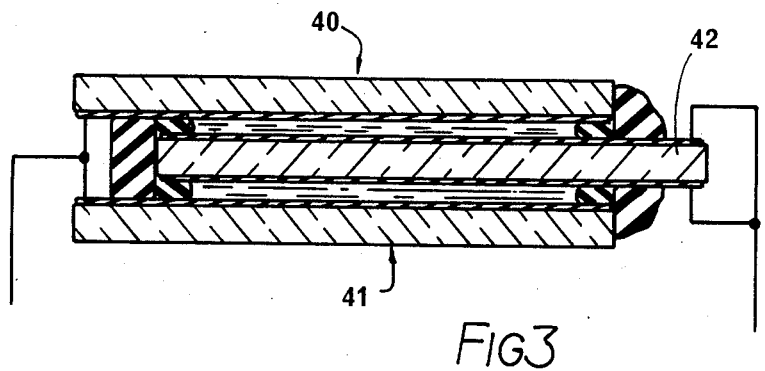
FIG. 3 is a cross-section of a device of the invention which incorporates two cells arranged contiguously.

Whenever there is a need for more scattering of light in the OFF state, two or more liquid crystal cells can be stacked in parallel layers. In FIG. 3, the two cells 40, 41 are illustrated as being stacked in parallel layers. The two cells 40, 41 may share one of the glass plates 42, as illustrated, or may be independently structured, that is, as two independent cells stacked face to face.

The gating circuit 9 is driven by a signal source 11 that produces suitable driving signals. In the drawing the gating circuit 9 has two sets of outputs, wherein one set of outputs is connected, as shown, to the electrodes 6 of the device 3, while the other set of outputs is connected to the corresponding electrodes of a similar device 3', which is not shown in the drawing. The two devices 3 and 3' are meant to be placed before each of the eyes of an observer. It is also possible for each of these devices to be connected to separate gating circuits and voltage sources. Depending on the purpose for which such devices are intended, the two devices 3 and 3' can be driven in phase or out of phase with each other, and it is also clearly possible to drive such devices completely independently of each other.

Two such shutter devices can be mounted on a spectacle frame, wherein each shutter device is placed in front of one of an observer's eyes. In such a configuration the visual information presented to each eye can be independently controlled. In some cases it can be sufficient to place a single device 3 in front of both eyes, while in other cases it can be desireable to place such a device between the observer and a source of visual information, for example, in the form of an advancing mechanism in front of the lens of a slide or film projector.

Figure 2:
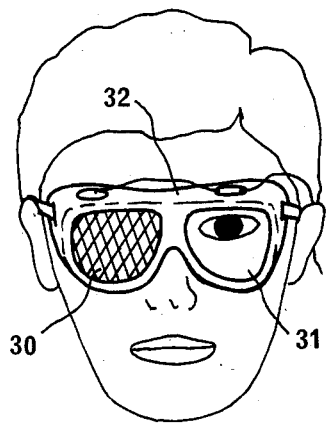
FIG. 2 is a frontal view showing a device of the invention positioned in front of the eyes of a viewing person.

FIG. 2 shows right and left cells 30, 31 arranged in front of the right and left eyes respectively of a person. The cells 30, 31 are disposed in the manner of lenses in a spectacle frame 32.

The right cell 30 is in the non-viewing condition, in which the right eye sees merely a blur of scattered light, appearing as a milky white textured surface. The left cell 31 is in the clear-viewing condition, in which the left eye clearly sees whatever is to be seen through the cell.

In order to allow the three dimensional perception of a displayed visual image, separate shutter devices 3 and 3' are placed before each eye of an observer and each shutter device is alternately switched in counter-phase at a cyclic frequency that is synchronized with the cyclic frequency at which a pair of appropriate display images are alternately presented, whereby each display image is intended for presentation to only one eye of the observer. Two advantages of this apparatus, as compared to the previously known shutter devices which use polarizing filters, are that there is no decrease in light transmission due to the use of polarizing filters and that there is also no distortion in the colour content of the displayed images, since the present liquid crystal in its transparent state does not alter the wavelengths of incident light.

The device used to present the display images can be a raster scanning device, such as a television screen, wherein successive raster scanning frames correspond to the alternating images intended for the two eyes. It is also possible to create images on a different type of display device by rapidly generating the individual vector elements of such images, where the display information is defined by an accompanying computing machine. By quickly computing and generating successive geometrically compatible side-by-side images and synchronizing the liquid crystal shutters accordingly, three dimensional images can be perceived. These images may be, for example, three dimensional computer-generated animated images or perspective displays of multidimensional functional relationships, such as may usefully be displayed for flight guidance information for aircraft. A further refinement which is possible with such display systems is interactive viewpoint dependent imaging, whereby the stereoscopic image perspective can be continuously translated and/or rotated in response to the changing viewpoint of the observer.

It is also possible to display information continuously as the displayed output of paired measuring or spatial information transmission devices or of light transmission devices, such as optical fibres. When such continuous side-by-side images are alternately projected or otherwise presented on a single display device, the present stereoscopic viewing device can be synchronized to render to the viewer a single three dimensional image. Whenever the continuous display images are alternately projected and mixed into a single display, such as might be done with optical fibres, the present shutter devices may be used for the purpose of alternately transmitting and blanking the display images as well.

Because the switching times from transparent to scattering and from scattering to transparent are very short, expecially as compared to both the previously known nematic liquid crystal shutter devices and the previously known shutter devices which make use of dynamic scattering, each of the left and right eye displayed images can be viewed by the corresponding eye for essentially the full duration of the cycle in which it is presented, or, in other words, there is essentially no time, as with other devices, during which both left and right eye information must be blanked simultaneously. Furthermore, during the period in which a particular eye is occluded from the displayed information, because it remains illuminated by scattered light the eye can adapt more easily to the increased illumination when display information is again presented than it would have been able to if the shutter had been dark when closed, as the case with the known devices which use polarizing filters. The ability with the present invention of the eye to adapt quickly is a very important factor in reducing the visual fatigue of the observer.

Because of the high switching speeds it is possible to modify some types of recording, playback and display equipment to operate with a higher raster frequency, in order to provide more rapidly alternating image frames to each eye and thus to reduce flicker effects. This same advantage can be achieved with those continuous and vector generating display devices which are capable of producing complete left and right eye images very rapidly. It is also possible to transduce or record the information in such a way that each eye is presented with only a portion of a raster scanning frame, in the form of horizontal bands for example, where the shutter for each eye is synchronized with the appropriate frame portion. The net increase in display presentation rate will act thus to reduce flicker effects.

An appreciable saving in energy can be obtained by constructing the switching circuit such that, after applying the large, but not unlimited, supracritical electric field necessary for rapid switching from the scattering state to the transparent state, the electric field is reduced for the remainder of the transparent state cycle to a value which is still above but closer to the critical value and which is able to maintain the transparent state. This energy saving can be especially advantageous if the spectacle mounted apparatus is to be operated with a portable, battery operated power supply.

The electrodes of such liquid crystal shutter devices can furthermore be subdivided into separately addressable segments, for example in the form of bands or rings or in matrix form, by means of which it is possible independently to occult visual information from or present information in different parts of the visual field of an observer. This can be useful for certain types of perceptual research, such as for mapping the functional visual field or for performing experiments on attention behaviour. With such subdivided electrodes the electric field applied to each segment can be adjusted such that each segment can be switched between transparent and scattering without affecting the neighbouring segments. It is possible, for a limited number of such segments and for certain types of patterns, to make direct electrical contact with each of the electrode segments, which may or may not have sections of electrode on the opposite plate which are common to more than one segment, and thus drive them directly. Because of the high switching speeds associated with the cholesteric-nematic phase change effect, it is also possible to operate matrix patterns with a much larger number of segments, by dividing each electrode into strips and placing the two plates such that the strips are oriented along opposite axes and then by making use of conventional methods of multiplexed addressing and driving.

A special application of the liquid crystal viewing device, furthermore, is its use for stroboscopic observation of rapidly recurring phenomena, such as with the motion of machine parts. For that purpose the most common method has been to use a special lamp which is able to produce very short and repetitive light flashes at controlled instants in time. Such flashes of light, however, can have a disturbing effect, both on the observer and also on others present in the vicinity. A viewing device such as the present device, when mounted on a spectacle frame and worn by an observer, can instead be used, whereby the short switching times and the transparent ON-state and scattering OFF-state permit periodic observations which are sufficiently sharp and well defined for most applications. By this method several different people in the same room can make stroboscopic observations of the same or different objects, completely independently of each other and without disturbing each other.

Another application of such a portable stroboscopic viewer is the ability continuously to adjust the frequency and duty cycle of switching of the liquid crystal cells or segments of cells and to have the wearer indicate the frequency at which flickering either is no longer perceived or reappears. The wearer in this case can be, for example, a worker or an experimental subject who may simultaneously be executing another assigned task. The so-called critical fusion frequency which is measured is often employed by ergonomists to rate the difficulty of an assigned task or the workload imposed on the operator performing that task.

A special application of the device according to the invention is as a tachistoscope, for perceptual research. With such a device one or both eyes of an experimental subject are presented separately or simultaneously with static or moving images for very short regulated periods of time. With conventional tachistoscopes the experimental subject must look into an enclosed container, which is a rather unnatural manner of presenting information, because the subject's visual field is limited and isolated from the actual surroundings and because the subject must remain more or less motionless. Whenever, however, the subject is able to wear spectacles comprising the shutter devices of the present invention, then his freedom of motion will be unhindered and the visual environment encompassing any presented target information can also be observed. The visual environment itself can furthermore comprise the intended target information, thus enabling tachistoscopic experiments in completely natural environments, such as in a moving automobile, which was not possible with conventional tachistoscopes. Such experiments can be valuable, for example, for investigating psycho-motor coordination, as well as for experiments and training in physical education, sports and sports medicine. Target information can also be presented to subjects on a television screen or a projection screen whereby if necessary the projectors used can also be equipped with shutter devices according to the invention. The power supply for a spectacle device on which the present shutter devices are mounted can be made portable, in order to increase the freedom of movement of experimental subjects, whereby the energy saving circuitry described earlier can also be very advantageous. If desired, such a portable apparatus can also be equipped with a facility for wireless transmission of the synchronizing and switching signals. Whenever the liquid crystal cells are subdivided into separately addressable segments, it also becomes possible to switch corresponding sections of the visual field on and off accordingly. The high switching speeds and nondistortion of colour are also important advantages here.

Devices according to the invention are useful, moreover, anywhere that similar or comparable conditions of presenting visual information exist and/or wherever high switching speeds, light scattering, a transparent ON-state and a scattering OFF-state, colour fidelity and the other properties of the present cholesteric-nematic phase change effect liquid crystals can be used to advantage, especially in education and in the natural, medical and behavioural sciences.

The following may be regarded as a non-restricting example of measured properties of one satisfactorily performing implementation of the present device:

| | |
|---|---|
| Composition of the liquid crystal | 15% cholesteric CB15 85% nematic E18 |
| Thickness of liquid crystal layer | 12 microns |
| Voltage for switching to the transparent state | 100 V rms |
| Voltage 4 ms after switching to transparent state | 60 V rms |
| Carrier frequency of driving voltage | 1 KHz |
| Time to switch fully to transparent (ON) state | less than 1 ms |
| Time to switch fully to scattering (OFF) state | 3 to 5 ms |

From this table it is apparent that the switching time to the transparent state is much shorter than the opposite switching time to the full scattering state. The electronic circuitry for such a device should therefore be constructed such that the turn-off gating signal should be sent, if necessary, at an appropriate earlier instant in time, to be defined by a compromise between this switching time delay on the one hand and the practical perceptual effect of incomplete scattering on the other, in order to ensure that the actual moment at which visual information is effectively occulted occurs at the correct desired moment in time.

What is claimed is:

1. A shuttering device for disposition in front of an observer, said shuttering device comprising:

a frame;

at least one liquid crystal cell installed in said frame, each said cell comprising two parallel transparent plates arranged face to face with a small space between them, transparent electrically conductive coatings on the facing surfaces of said plates, insulation and sealing means for electrically insulating said conductive coatings on said plates from each other and for enclosing and sealing said small space between said plates, and liquid crystal material filling said sealed space between plates, said liquid crystal material being of the type which undergoes a cholesteric-nematic phase change between a transparent phase when subjected to a electric field across said plates of intensity greater than a critical value and a translucent light-scattering phase when said electric field is removed or reduced to a level lower than said critical value; and an electrical terminal connected to each said conductive coating for electrical connection whereby an electric field can be applied across said cell to cause said liquid crystal material to change phase from its scattering to its transparent state.

2. A device as recited in claim 1, in which said frame is in the form of a spectacle-like structure having two spectacle openings, each said opening containing at least one of said liquid crystal cells.

3. A device as recited in claim 2, further comprising an alternating current voltage source, a gating circuit connected to said alternating current voltage source and having two driving circuit outputs, one said driving circuit output being connected via respective ones of said electrical terminals across each of the at least one liquid crystal cell of one speciacle opening, and the other said driving circuit output being connected via respective ones of said electrical terminals across each of the at least one liquid crystal cell of the other spectacle opening, and signal sources connected to said gating circuit for controlling said gating circuit to thereby control the signals supplied by said alternating current voltage source to said driving circuit outputs.

4. A device as recited in claim 3, in which said alternating current voltage source, said gating circuit, and said signal sources cause said driving circuits, in order to trigger said cholesteric-nematic phase change, to produce an electric field momentarily substantially greater than said critical value, to then produce a field which is smaller than said momentary electric field but greater than said critical value, and in order to cause a return to said translucent light-scattering phase, to then reduce said electric field to a level which is lower than said critical value.

5. A device as recited in claim 1, comprising a plurality of said liquid crysial cells installed within said frame, said cells being stacked face to face in parallel layers, and comprising a transparent plate between adjacent cells which constitutes one of said two transparent plates for each of said adjacent cells, that is, which constitutes a common plate between said liquid crystal filled spaces of said adjacent cells, said common plate being coated on both sides with said transparent electrically conductive coating.

6. A device as recited in claim 2, comprising a plurality of said liquid crystal cells installed within each spectacle opening of said frame, said cells being stacked face to face in parallel layers.

7. A device as recited in claim 6, where each pair of parallel adjacent liquid crystal cells is constructed with one common transparent plate between said liquid crystal filled spaces of said adjacent cells, said common plate being coated on both sides with said transparent electrically conductive coating, and said common plate constituting one of said two transparent plates for each of said adjacent cells.

* * * * *

UNITED STATES PATENT AND TRADEMARK OFFICE
CERTIFICATE OF CORRECTION

PATENT NO. : 4,698,668
DATED : October 6, 1987
INVENTOR(S) : Paul Milgram

It is certified that error appears in the above-identified patent and that said Letters Patent is hereby corrected as shown below:

On the title page Item (30), delete "Foreign Application Priority data".

Signed and Sealed this

Twenty-fourth Day of May, 1988

*Attest:*

DONALD J. QUIGG

*Attesting Officer*     *Commissioner of Patents and Trademarks*